United States Patent
Edwards et al.

(10) Patent No.: US 6,657,580 B1
(45) Date of Patent: Dec. 2, 2003

(54) TRANSPONDERS

(75) Inventors: John David Edwards, Oxford (GB); John Thornton, Oxford (GB)

(73) Assignee: ISIS Innovation Limited, Oxford (GB)

( * ) Notice: Subject to any disclaimer, the term of this patent is extended or adjusted under 35 U.S.C. 154(b) by 0 days.

(21) Appl. No.: 09/937,422

(22) PCT Filed: Mar. 24, 2000

(86) PCT No.: PCT/GB00/01136
§ 371 (c)(1),
(2), (4) Date: Dec. 27, 2001

(87) PCT Pub. No.: WO00/59068
PCT Pub. Date: Oct. 5, 2000

(30) Foreign Application Priority Data

Mar. 26, 1999 (GB) .............................. 9907117
Jun. 2, 1999 (GB) .............................. 9912840

(51) Int. Cl.⁷ .............................. G01S 13/75; G01S 7/28
(52) U.S. Cl. ........................................ 342/51; 342/175
(58) Field of Search .............................. 342/51, 42, 43, 342/44, 45, 5, 6, 175

(56) References Cited

U.S. PATENT DOCUMENTS

| | | | | |
|---|---|---|---|---|
| 4,307,939 A | * | 12/1981 | Berg | 359/529 |
| 4,535,337 A | * | 8/1985 | MacAnlis | 343/737 |
| 5,361,071 A | * | 11/1994 | van Zon | 342/42 |
| 5,387,916 A | | 2/1995 | Cohn | |
| 5,426,667 A | * | 6/1995 | van Zon | 375/219 |
| 5,583,507 A | * | 12/1996 | D'Isepo et al. | 342/45 |
| 5,819,164 A | * | 10/1998 | Sun et al. | 455/106 |
| 5,822,683 A | | 10/1998 | Paschen | |
| 6,100,840 A | * | 8/2000 | Zidek et al. | 342/42 |
| 6,239,764 B1 | * | 5/2001 | Timofeev et al. | 343/795 |
| 6,317,095 B1 | * | 11/2001 | Teshirogi et al. | 343/785 |

OTHER PUBLICATIONS

"Non–uniformly spaced sub–arrayed printed self–tracking reflector antenna", Girvan, T.F.J.; Fusco, V.F., Antennas and Propagation, 2001. Eleventh International Conference on (IEE Conf. Publ. No. 480), vol.: 2, 2001, page(s): 817–820 vol. 2.*

"24 GHz active retrodirective antenna array", Tzung–Jir Hong; Shy–Jong Chung, Electronics Letters, vol.: 35 Issue: 21, Oct. 1, 1999, page(s): 1785–1786.*

"A retrodirective microstrip antenna array", Shyh–Jong Chung; Kai Chang, Antennas and Propagation, IEEE Transactions on, vol.: 46 Issue: 12, Dec. 1998, page(s): 1802–1809.*

* cited by examiner

*Primary Examiner*—John B. Sotomayor
(74) *Attorney, Agent, or Firm*—Volpe and Koenig, P.C (57) ABSTRACT

A transponder comprises a retro-reflective antenna array in which the length of the transmission lines is given by $l=\pm A$ $n\lambda$ where: A is an arbitrary length; n is zero, or an integer, $\lambda$ is the wavelength of the retro-reflected signal. The array is fabricated on a board (71) of insulating material, using microstrip techniques. Rectangular patches (not shown) form the individual antennae and these are interconnected by transmission lines (75 to 82), each of which pass through a respective modulation device (43) whereby the retro-reflected signal is modulated. A positioning/tracking system incorporating one or more modulated transponders is also disclosed.

30 Claims, 9 Drawing Sheets

TRANSPONDERS

BACKGROUND OF THE INVENTION

This invention relates to transponders and in particular to transponders using antenna-based retro-reflectors, and to positioning/tracking systems utilising such transponders.

A retro-reflector is a device which reflects incident radiation falling upon it back upon its incident path. It is known to use a retro-reflector as the basis for an active or passive transponder; the rationale behind this is the establishment of a communication link by reflecting an interrogating signal back towards its source, thus eliminating the need for a transmitter and its associated equipment at the target.

In the application of radar to terrestrial traffic control there is an increasing need to detect, track and identify craft within the surveillance area. This is of particular relevance to harbour and airport traffic management, particularly considering small vehicles with inherently low radar cross sections (RCS). At present, simple retro-reflectors comprising corner structures are sometimes employed on small boats to increase their RCS. Clearly, a requirement of future transponders employed in these fields are simplicity, light weight, low cost and low power consumption.

Long range identification is traditionally achieved by actively transmitting a response to an interrogating radar. Such a method is employed by the military "Interrogate Friend or Foe" (IFF) system. However, a disadvantage of this approach is the requirement for a transmitter and signal processing equipment on board the target. Also, the response signal is transmitted omnidirectionally, which requires a transmitted power which is excessively large to establish the communication link and also pollutes the local radio environment.

Figure 1:
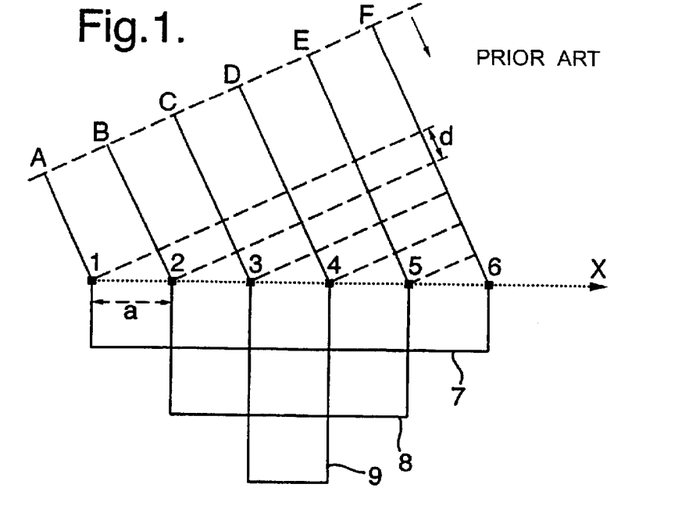
FIG. 1 is a diagrammatic side view of a single-dimension retro-reflective antenna array of the Van Atta type.

It is known to use a retro-reflective antenna array in a transponder. Such arrays are based on the Van Atta array first described in U.S. Pat. No. 2,908,002. The Van Atta array comprises a single or multi-dimensional array of antennas in which antenna pairs are joined by transmission lines of equal electrical length. FIG. 1 of the accompanying drawings shows a single-dimensional Van Atta array comprising six dipole antennas 1 to 6. The dipoles are linked in pairs by means of respective transmission lines as follows:

Dipoles 1 and 6 linked by transmission line 7;
Dipoles 2 and 5 linked by transmission line 8; and
Dipoles 3 and 4 linked by transmission line 9.

The transmission lines 7, 8 and 9 are all of equal electrical length, and it can be shown that the result of such linkage is that an electromagnetic wave front A to F incident on the array will be reflected away from the array back along the direction of incidence.

Consider a plane wave incident at an angle θ to the x-axis. If we take points A to F in the incident wave front, energy from point A is received by antenna 1 and re-radiated by antenna 6, energy from point F is absorbed by antenna 6 and re-radiated by antenna 1, and so on for the other antenna pairs. The path lengths AF, BE and CD are all equal and the radiated power from each antenna therefore adds constructively in the direction θ i.e. the reflected wave is in the same direction as the incident wave.

A problem arises in practical use of the Van Atta array because of the requirement that all of the transmission times have to be of the same electrical length. Fabricating a two-dimensional planar array, for example, is next to impossible if the extra complication and expense of crossovers is to be avoided.

BRIEF SUMMARY OF THE INVENTION

In a first aspect of the present invention, this problem is avoided by providing that the length of the transmission lines interconnecting the individual antennas in the array are of a length l given by:

$$l = A \pm n\lambda$$

where:
A is an arbitrary length;
n is zero, or an integer;
λ is the wavelength of the electromagnetic wave to be retro-reflected.

If n=0 for all transmission lines then this, in effect, defines a Van Atta array since the transmission lines in such an array are all of an equal arbitrary length. Therefore, it is further provided in the present invention that at least some of the transmission lines have a non-zero value of n. It is therefore inherent in the present invention that not all the transmission lines have the same length.

The elongation of any one of the transmission lines 7 to 9 by an amount equal to a multiple of the wavelength of the incoming signal means that the outgoing signal, when it reaches the plane A–F, will have the same phase as it would have had if the corresponding transmission line had not been lengthened. Therefore the power from each antenna still adds constructively in the direction θ, and the array continues to operate in a retro-reflective manner.

However, the arrangement is now frequency sensitive because the outgoing signal will only arrive in phase at plane A–F if the extra length of the interconnecting transmission line is a multiple of the incoming wavelength. This might be perceived as a disadvantage but in fact is often actually an advantage because, particularly in security or military applications, it provides an extra, albeit small, degree of security. In practice, it is not a difficulty that a single interrogating frequency has to be used, particularly when it is borne in mind that the antennas themselves are already frequency selective. Furthermore, the device can act as a filter returning to an interrogating transceiver only a single frequency or, in practice, a passband of frequencies.

The use of unequal length transmission lines, as described above, enables two-dimensional retro-reflective antenna arrays to be fabricated onto any of the known planar media, such as microstrip, stripline, or dielectric or optical waveguides but would also enable arrays to be built in conventional cavity waveguides. Even if the array is non-planar, the ability to make some of the transmission lines of different lengths to others considerably eases the physical design problem of interconnecting pairs of antennas in a two dimensional array. In fact, the invention gives almost complete freedom as to the length of the transmission lines which greatly assists in the design process. Clearly, however, there is an upper limit on length above which transmission line losses will become unacceptable. Also large length differences will give rise to differentials in the loss characteristics as between different transmission lines which may degrade operation if carried to excess.

Given the above constraints, the length A can literally be chosen arbitrarily and can even be zero, but a zero value would impose a pointless limitation on the transmission line lengths, namely that they would all have to be equal to a multiple of the wavelength. More sensibly, the length A may be chosen to be either the smallest or the largest convenient physical length, and the remaining lengths will either be the same as the arbitrary length or, where this is not possible due to physical or other constraints, will be greater or smaller than the arbitrary length by an amount equal to an integer multiple of the wavelength. Thus it is possible for any one array to have just one or two transmission lines which are different in length from the rest or, at the other extreme, every single transmission line may have a different length all subject, of course, to the length formula quoted above.

In an embodiment of the invention, means are provided for modulating the retro-reflected signal so that the target may identify itself to the interrogator. Conveniently, said modulation means comprises a modulation device connected in at least some, and preferably all, of the transmission lines in order to modulate the signal passing from one antenna of the array to another via the transmission line. Each modulation device may comprise active or passive circuitry.

The modulation means may be realised by any device which is operable to modulate the signal so that modulation products are produced in the frequency domain. Thus the modulation may comprise switching in the time domain to achieve amplitude modulation or frequency/phase modulation, or the modulation may comprise various forms of splitting the signal, delaying the split components by varying amounts and thence recombining the delayed components to produce a multiplexed signal comprising a summation of the individual components. In all cases, the modulation process gives rise to modulation products in the frequency domain.

Applications for such a transponder include ground radar for vehicle identification and location, avionic landing systems, terrestrial and space communications, local area networks, and terrestrial traffic control such as harbour and airport management where a large number of small vehicles need to be tracked. Other applications include radar measurement and navigation such as satellite systems, remote sensing, road vehicle systems and general maritime applications. For example, the transponder may be attached to a marine or avionic navigation beacon such as a buoy or a lighthouse. If the retro-reflected signal is modulated with a code unique to the target, the target may identify itself to the interrogator. Alternatively the modulation device may include means for frequency modulating the retro-reflected signal in order to mimic doppler shifting to thus make the target appear to be moving when in fact it is not, or vice versa.

In an embodiment of the invention, the modulation device comprises switching means controlled by a modulating signal, said switching means being operable to cyclically switch an incoming signal about a plurality of paths at least some of which contain circuit elements operable to vary a parameter of the signal and thus modulate the signal at the frequency of the modulating signal. For example, the circuit elements may comprise means for altering the amplitude or the phase of the signal travelling along the transmission line, thus producing an amplitude or phase modulated wave.

In an embodiment, in order to realise amplitude modulation, the switching means is operable to connect said incoming signal alternately to a straight-through connection in which the signal passes through the device with its amplitude substantially unchanged and to a load which wholly or partially absorbs the signal. Likewise, in order to realise phase modulation, the switching means is operable to connect said incoming s signal alternately between two paths of different path length. Preferably the difference between the path lengths is half the wavelength of the incoming signal. The switching means preferably comprises semi-conductor switches such as switching diodes.

In an alternative embodiment of the invention, the modulation device comprises splitter means for splitting the incoming signal into at least two paths, a circuit element being connected in each path and operable to vary some parameter of the signal passing along the path. In addition a combiner means is provided for recombining the signals from the individual paths. Preferably, these circuit elements take the form of delay elements, the arrangement being such that the delay times for the different paths are set differently so that the recombined signal is a summation of the original signal passing along the transmission line, delayed by different amounts.

Up to now it has been assumed that, although the modulation means is able to impart information to the retro-reflected signal, this information is essentially fixed by the characteristics of the modulation means and may comprise, for example, identification information which identifies the item to which the transponder is attached. However, in an embodiment of the invention, the modulation means may be such as to carry transient information, as well as, or instead of, the "fixed" information referred to above. To this end, the transponder may further comprise a variable input means such as a sensor for generating a signal indicative of some parameter, perhaps relating to the environment local to the transponder, which signal is passed to the modulating means so as to vary the modulation in some way in accordance with the signal. Thus where, for example, the transponder is on a moving object, the sensor could generate a signal indicative of the position of the object so that an interrogating transceiver will receive back from the transponder not only "fixed" information identifying the object but also transient information indicating its position. Sensors might also detect such things as local temperature or pressure, or the existence of malfunctioning equipment.

The manner in which the signal from the sensor operates on the modulation will depend upon the type of modulation being used and the nature of the sensor signal itself.

The variable input means may alternatively, or as well as, include some form of manual intervention device. To this end, the variable input means may include an input device such as a keyboard or keypad which could be used to input information which would effect the modulation means so as to vary the modulated signal. In this way, a person in the vicinity of the transponder could send messages via the retro-reflected signal. Such messages could be stored locally in a memory until such time as the interrogating transceiver sweeps the transponder.

In a further embodiment of the invention, amplifier means are provided in at least some, and preferably all, of the transmission lines in order to amplify the signal passing from one antenna of the array to another via the transmission line. Such amplifier means are preferably bi-directional—i.e. are capable of amplifying signals travelling in either direction.

The amplifier means may be used instead of, or in addition to, the aforementioned modulation means; indeed the amplifier means may itself be modulated to provide both functions in a single unit.

In a further aspect of the invention there is provided a positioning/tracking system for fixed or movable objects, said system comprising at least one modulated transponder, a transmitter for transmitting a signal to illuminate the or each transponder, a receiver for receiving the retro-reflected signal from the transponder or transponders and discriminator means within the receiver for demodulating the modulated signal from the transponder or transponders to enable a wanted reflected signal to be identified.

For example, each transponder may be attached to a fixed or movable object whose position is to be ascertained.

Alternatively the multiple spaced modulated transponders may be used to achieve ranging.

A particular realisation of such a system is a vehicle positioning/tracking system, for example for airports, where the object takes the form of a vehicle such as an airport service vehicle or an aircraft which is taxiing or coming in to land—blind aircraft landing system. For this purpose, a modulated retro-reflector is mounted on the vehicle so that its position can be readily ascertained by means of an associated illuminating transmitter and interrogating receiver. The use of modulation greatly improves the ability of the receiver to discriminate the wanted vehicle from the cluttered background since the modulation can provide a unique radar "signature" which can be identified.

In an embodiment, the frequency of the illuminating transmitter is swept to provide range information. The target in this case either comprises or has mounted thereon a modulated retro-reflector, for example of the type described above.

For the establishment of a duplex communications link, a passive transponder (i.e. one in which there is no transmitter) may be required to change its state depending on a stimulus derived from a control signal contained within the illuminating radiation. The microwave retro-reflective antenna is highly suitable for modification to fulfill the requirement for such a two way link. Since the array comprises antennas and transmission lines which efficiently guide the incident microwave radiation into microstrip circuitry (unlike optical corner-type reflectors), this radiation is available to be sampled and processed by additional logic circuitry. The transponder may then respond to incoming control stimuli and change its state of modulation accordingly.

The transponder may be self-powered, for example by the incident radiation, in a similar manner to a conventional radio tag, but the energy thus collected would not be re-radiated as RF but used only for the modest power requirements of the modulation circuitry integral to the passive array. Since high data rates are possible (10 MHz at present), a transponder operated in this mode could have a "quiet", or charging period which is long compared to the period of energy consumption where the modulation is activated, yet still convey an information rate of many Kbits/s. The duty cycles necessary will be derived from the power link budgets available in a given system application.

BRIEF DESCRIPTION OF THE SEVERAL VIEWS OF THE DRAWINGS

In order that the invention may be better understood, several embodiments thereof will now be described by way of example only and with reference to the accompanying drawings in which:

FIGS. 11 to 15 are graphs illustrating the results of tests carried out on a transponder built in accordance with the invention and incorporating a 4×4 retro-reflective antenna array such as illustrated in FIG. 8;

DETAILED DESCRIPTION OF THE PREFERRED EMBODIMENTS

Figure 2:
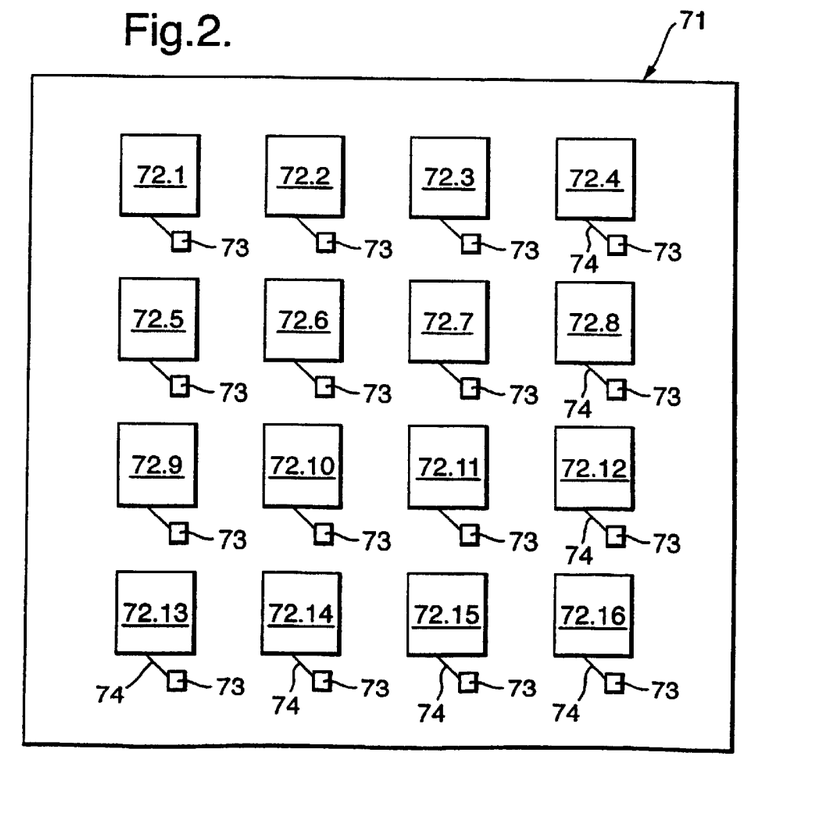
FIG. 2 is a diagrammatic plan view of a 4×4 microstrip antenna array for use in the transponder of the present invention.
Figure 3:
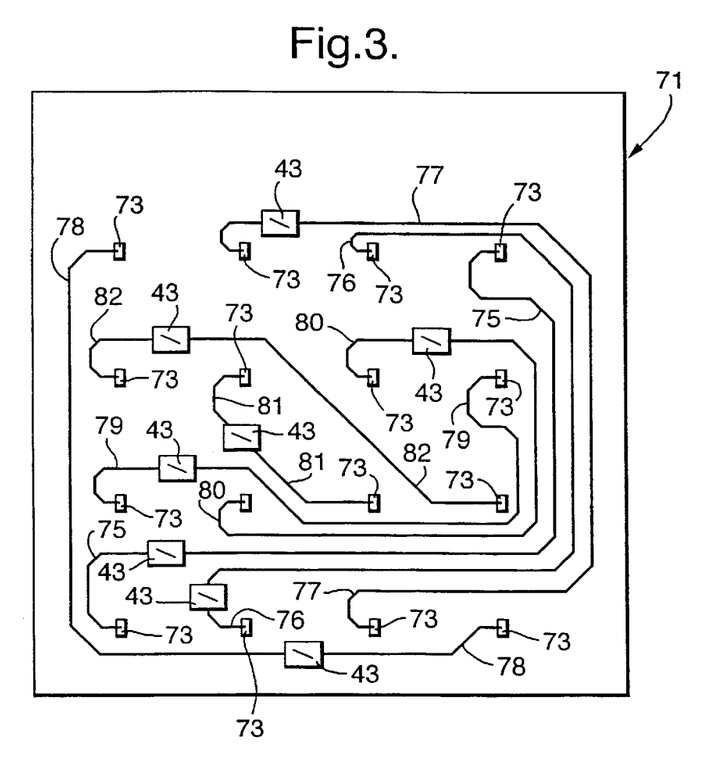
FIG. 3 is a diagrammatic plan view of the opposite side of the microstrip array of FIG. 2, showing the interconnections on the reverse side.

Referring firstly to FIG. 2 there is shown how a two-dimensional array may be realised, using microstrip techniques. The antenna array is fabricated on a board 71 of insulating material on which are formed rectangular patches 72.1 to 72.16 of conductive material. Each rectangular patch acts as an individual antenna, so it will be seen that the drawing illustrates a 4×4 array. The RF feed comprises a high impedance microstrip transmission line 74 which matches the antenna impedance to the impedance of a microstrip stub 73 which is coupled to microstrip circuitry on the rear side of the board 71. As shown in FIG. 3, the interconnections between the individual antennas forming the array are conveniently made on the rear side of the board 71. In such an array, the antenna would be interconnected using microstrip transmission lines 75 to 82, as follows:

Transmission line 75: 72.1 to 72.16
Transmission line 76: 72.2 to 72.15
Transmission line 77: 72.3 to 72.14
Transmission line 78: 72.4 to 72.13
Transmission line 79: 72.5 to 72.12
Transmission line 80: 72.6 to 72.11
Transmission line 81: 72.7 to 72.10
Transmission line 82: 72.8 to 72.9

Connected in series with each of the transmission lines 75 to 82 is an amplifier (not shown) and/or modulation device 43. It can be seen from FIG. 3 that, in order to realise the physical requirements of interconnecting the antennas in the manner described above, and without any one transmission line from crossing over another, it is necessary that at least some of the transmission lines 75 to 82 be of a different length to others. In the present invention, this is achieved by making all of the transmission lines of a length l such that:

$l = A \pm n\lambda$ where
- A is an arbitrary length;
- n is zero, or an integer; and
- λ is the wavelength of the electromagnetic wave.

The value A can, subject to the discussion above, be chosen arbitrarily but, once chosen, is the same for all transmission lines of a particular array. Note that the length l is the whole length from one antenna to another, and therefore includes the length of the linking transmission lines 74 and microstrip stubs 73 at each end, as well as any length effects within the modulation devices 43. Generally speaking, the effects of these lengths will be the same for each transmission line, as in the example illustrated, and the lengths can therefore be notionally included within the arbitrary length A. However, if any of these factors are different as between transmission lines, this will have to be taken into account.

It will be seen from FIG. 3 that transmission line 81 is the shortest and one convenient way of calculating the remaining lengths would be to regard the length of this transmission line, possibly including the lengths of items 43, 73 and 74, as discussed above, as the arbitrary length A. In other words, the value of n in this case is zero. Having decided on the value of length A, the remaining lengths can be set with different values of n, according to the individual physical requirements. Other ways of setting length A will be apparent to the skilled worker.

In deciding on the positions of transmission lines 75 to 82, it is desirable to avoid crossovers since these immediately imply the presence of additional layers of circuitry, with additional complication and expense, as well as the danger of electromagnetic interaction if adjacent transmission lines approach one another too closely.

The modulation devices 43 and amplifiers (if fitted) may be positioned anywhere along the transmission line, as is dictated by the physical constraints of the layout. The modulation devices operate in a bi-directional manner and therefore their position in the transmission line should not affect operation.

A printed 4×4 array fabricated along the above principles has been demonstrated at RF frequencies in the range 9 to 9.5 GHz and modulation frequencies up to 10 MHz, using approximately 0.1 mW of power to drive PIN diode phase switches printed on the rear of the array. The array measures approximately 100 mm square.

The modulation devices 43 are intended to achieve modulation of the retro-reflected signal. Modulation can be effected by various means, both active and passive, and the following description includes examples of suitable devices.

Figure 4A:
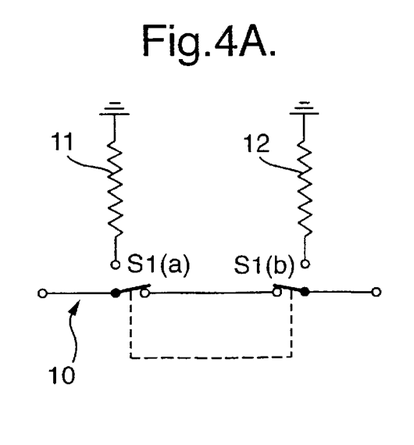
FIG. 4 is a schematic view of the circuitry used to achieve amplitude modulation.
Figure 4B:
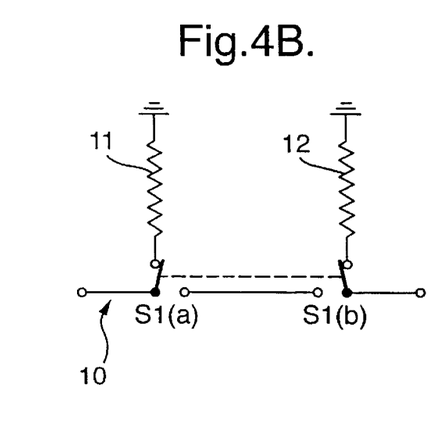
Figure 5:
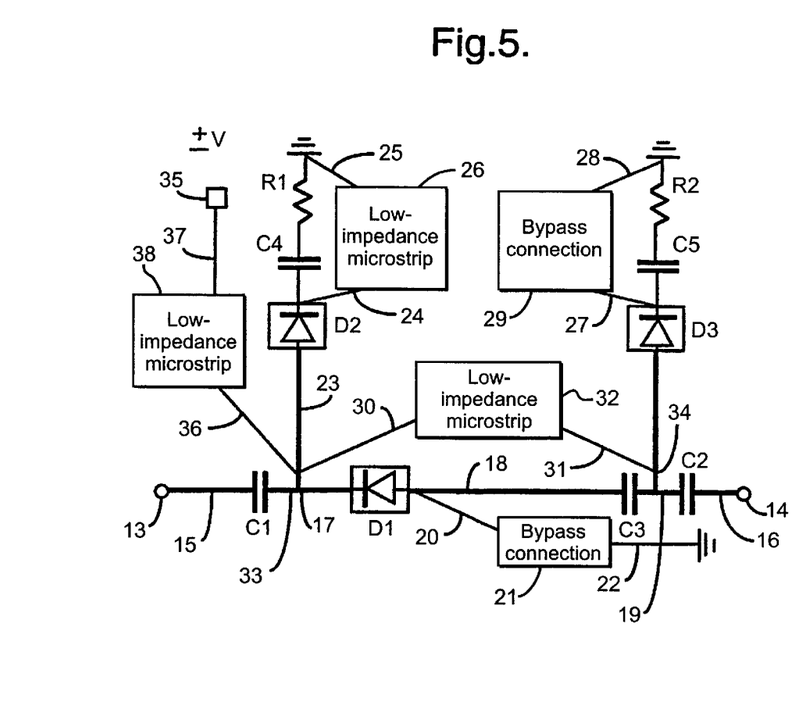
FIG. 5 is a view showing the modulation circuitry of FIG. 4 in greater detail.

FIGS. 4 and 5 illustrate a device for amplitude modulating the retro-reflected signal. A representative transmission line is shown under the reference 10, but it will be understood that a plurality, or preferably all, of the transmission lines will be similarly equipped. A ganged two-pole, two-way switch S1(a), S1(b) is connected in the transmission line as shown and is operable to switch signals travelling along the transmission line in either direction into one or the other of a pair of matched loads 11, 12. For example, where the transmission lines are 50 Ω coaxial cables, the loads 11, 12 would comprise 50 Ω resistors.

FIG. 4 shows the switch SI in its two alternative positions: FIG. 4A shows a first position in which the signal passes through unaffected and, with the switch in this position, the array will operate as a normal retro-reflective array. FIG. 4B shows a second position in which the signal approaching from the left of the drawing is switched into and absorbed by load 11 and the signal approaching from the right of the drawing is switched into and absorbed by load 12.

FIG. 5 illustrates how the amplitude modulation circuitry of FIG. 4 might be realised on microstrip measuring approximately 50 mm×50 mm. RF signals are passed in to and out of the circuit at terminals 13,14 to which the transmission line 10 (not shown) is attached. The switch circuitry is isolated by respective capacitors C1 and C2 connected to terminals 13 and 14 respectively by 50 Ω microstrip 15, 16 respectively. The capacitor C1 is connected via 50 Ω microstrip 17 to the cathode of a switching diode D1 such as a PIN diode. The anode of the diode D1 is connected via 50 Ω microstrip 18, a further isolating capacitor C3 and 50 Ω microstrip 19 to the capacitor C2. The anode of diode D1 is also connected via high-impedance microstrip 20, low-impedance microstrip 21 and further high-impedance microstrip 22 to ground.

Forming a T-junction 33 with the microstrip 17 are series connected 50 Ω microstrip 23, switching diode D2, isolating capacitor C4 and load resistor R1, all interconnected with 50 Ω microstrip. The remote end of resistor R1 is connected directly to ground. Connected from the cathode of diode D2 to ground is a bypass connection consisting of high-impedance microstrip 24,25 and low-impedance microstrip 26.

Forming a T-junction 34 with the microstrip 19 is a corresponding set of series-connected components: switching diode D3, isolating capacitor C5 and load resistor R2 together with bypass connection 27,28 and 29.

Interconnecting the two 50 Ω microstrip T-junctions 33, 34 is a further bypass connection consisting of high-impedance microstrip 30, 31 and low-impedance microstrip 32. The T-junction 33 is connected to a control input terminal 35 via high-impedance microstrip 36, 37 and a low-impedance microstrip 38.

In use, the control input terminal 35 is connected to a signal generator supplying an alternating square wave of, typically, ±1 volts with respect to ground. With a positive potential at terminal 35, the T-junction 33 becomes positive with respect to ground which switches diode D1 off and diode D2 on thus at the same time providing RF isolation between T-junctions 33 and 34, and switching the RF signal entering at terminal 13 via the diode D2 and capacitor C4 to the load resistor R1, where it is absorbed. The bypass connection 24, 25 and 26 maintains DC current flow through diode D2 without unduly disturbing the RF signal. The bypass connection 30, 31 and 32 interconnects the T-junction 33 and 34 at DC and the junction 34 therefore likewise takes up a positive potential with respect to ground. Thus the diode D3 is likewise switched on so that the RF signal applied at terminal 14 is directed to resistor R2, and is absorbed. Bypass connection 20, 21 and 22 maintains a DC current flow through diode D1. This thus corresponds with the switch position shown in FIG. 4B.

When a negative potential is applied to terminal 35, a corresponding negative potential appears at T-junctions 33 and 34 and this causes diode D1 to switch on, thus interconnecting the T-junctions 33 and 34 at RF frequencies, and further causes diodes D2 and D3 to switch off, thus isolating the load resistors R1 and R2 at RF frequencies. This thus corresponds with the switch position shown in FIG. 4A.

Figure 6A:
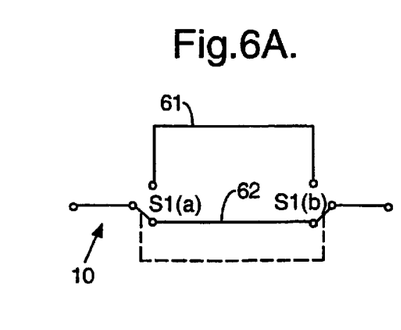
FIGS. 6 and 7 correspond with FIGS. 4 and 5 respectively, but show an example of circuitry used to achieve phase modulation.
Figure 6B:
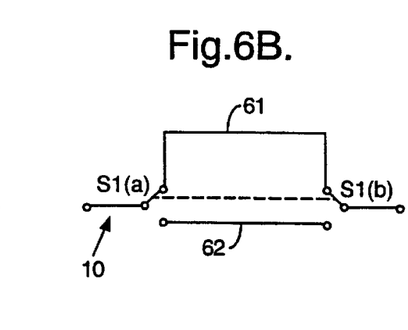
Figure 7:
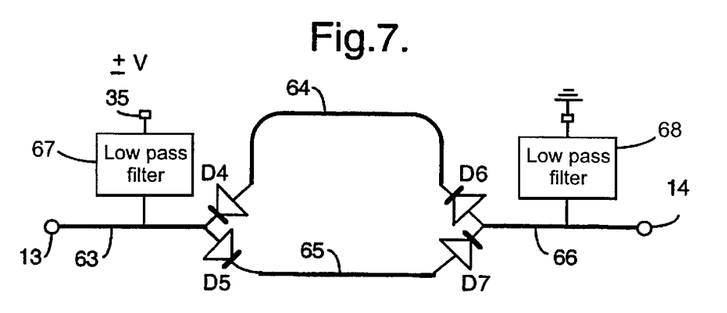

FIGS. 6 and 7, corresponding to FIGS. 4 and 5 respectively, illustrate a device for phase modulating the retro-reflected signal. This is the technique utilised in the exemplary microstrip array illustrated in FIGS. 2 and 3. In FIG. 6, the switch SI is used to direct the signal travelling along the transmission line 10 into one of two alternative paths 61,62, one of which is physically longer than the other, resulting in a different phase shift according to whether the switch is in its lowermost position, illustrated in FIG. 6A, or its uppermost position, illustrated in FIG. 6B. The path lengths as between the two paths are, as already mentioned, different Advantageously the path length of the longer path 61 is half a wavelength greater than the path length of path 62, this giving the maximum phase difference between the two switch positions and hence the strongest modulation.

FIG. 7 illustrates diagrammatically the way in which the circuitry of FIG. 6 can be realised in microstrip. The terminal 13 is connected to microstrip 63 which is in turn connected to the cathode of a switching diode D4 and the anode of a switching diode D5. The anode of diode D4 connects to a microstrip 64 and the cathode of diode D5 connects to a microstrip 65. The path lent of microstrip 64 is longer than that of microstrip 65, preferably by $$\frac{\lambda}{2},$$

where X is the wavelength in the transmission line. The remote end of microstrip 64 is connected to the cathode of a switching diode D6 and the remote end of microstrip 65 is connected to the anode of a switching diode D7. The anode of diode D6 and the cathode of diode D7 connect to one end of a microstrip 66 which connects, at its other end to the terminal 14. The control input terminal 35 is connected to microstrip 63 via a low pass filter 67 and the microstrip 66 is connected to earth via a low pass filter 68.

In use, with a positive potential at terminal 35, the diodes D5 and D7 are switched on and the diodes D4 and D6 are switched off, thus routing the signal along the shorter microstrip 65, and at the same time isolating the microstrip 64. With a negative potential applied to terminal 35 the diodes D4 and D6 are switched on and diodes D5 and D7 are switched off, thus routing the signal along the longer microstrip 64, and at the same time isolating the microstrip 65.

Figure 8:
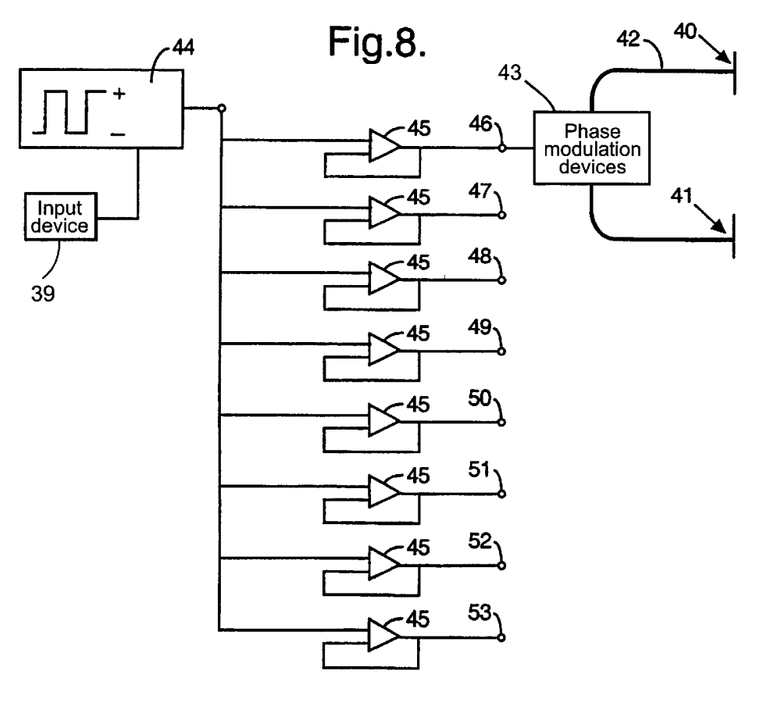
FIG. 8 is a block diagram of a microwave transponder incorporating a 16 element retro-reflective antenna array.

Reference is now made to FIG. 8 which shows a transponder made in accordance with the invention. The transponder comprises a retro-reflective antenna array comprising eight pairs of dipole antennas, just one pair of which is shown under references 40, 41 interconnected by a transmission line 42. The length l of each of the transmission lines is given by:

$$l = A \pm n\lambda$$

where

A, n and λ are defined above.

In addition the value of n for at least one of the transmission lines is not equal to that of the remainder.

Connected in series with the transmission line 42 is a modulation device 43 of the type, for example, described above with reference to FIGS. 2 and 3, or alternatively with reference to FIGS. 4 and 5. The control input to each of the eight modulation devices is provided from a signal generator 44 via a respective current gain amplifier 45. Each of the amplifiers 45 has a respective output terminal 46 to 53 which is connected to the terminal 35 in a respective modulation device in the transmission lines between the antenna pairs.

Optionally a sensor or manual input device 39 may be connected to the signal generator. Item 39 generates a signal which is representative of some parameter sensed by a sensor and/or some information entered manually on an input device such as a keyboard or keypad. This signal affects some parameter of the output of signal generator 44 so that the modulation carries transient information from the sensor or input device 39. In the event that the transponder is not continuously interrogated, the signal from item 39 may be temporarily stored in a memory means (not shown) until the next interrogation takes place.

The square wave output from the signal generator 44 is operable to simultaneously place each of the modulation devices 43 in the same state—i.e. either as shown in FIG. 4A/6A or as shown in FIG. 4B/6B. Thus, in the case of the amplitude modulation device illustrated in FIGS. 4 and 5, the array as a whole switches between reflective and absorptive on a cyclic basis at the frequency of the signal generator. The signal generator thus, in effect, amplitude modulates the signal reflected from the array, the frequency of modulation being that of the signal generator. Likewise, in the case of the phase modulation device illustrated in FIGS. 6 and 7, the array switches between one phase and another on a cyclic basis at the frequency of the signal generator. The signal generator thus, in effect, phase modulates the signal reflected from the array, the frequency of modulation being that of the signal generator.

The transponder illustrated in FIG. 8 can also be operated as a "dark" array. For example, when used with the circuitry shown in FIGS. 4 and 5, the signal generator 44 may apply a constant polarity signal which is operable to switch the switch SI permanently into the position shown in FIG. 4B, thus resulting in the absorption of the signals passing along the transmission line 42. Under these circumstances the array is in a state of zero or low reflectivity which can be used to minimise its radar signature. In this condition, the low reflectivity condition is bandwidth limited by the bandwidth of the antennas 40,41.

Likewise when the transponder is used with the circuits of FIGS. 6 and 7, the array can be made to operate as a "dark" array. This may be achieved by modifying the control signals applied to the phase modulation devices 43 in such a way that half are applied in anti-phase compared to the other half. In these circumstances the modulation products generated by half the array would be in anti-phase to those generated by the other half and destructive interference, resulting in zero or low reflection, would occur for all look angles. Again the device is bandwidth limited at the wavelength of the wave travelling along the transmission line 42, together with (n+½) multiples where n is an integer.

Figure 11A:
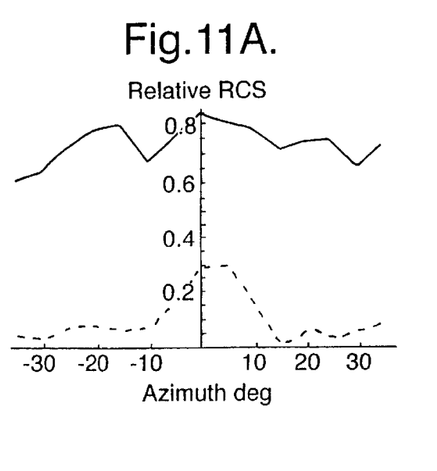
FIG. 11 shows the variation of array RCS with look-angle; solid line shows dipole pairs linked (retro-reflective), dotted line shows dipoles with 50 Ω loads.
Figure 11B:
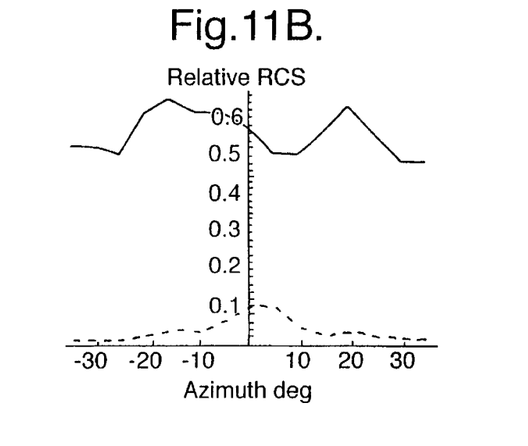

There will now be described the results of tests carried out on a transponder based on an antenna array consisted of a 4×4 matrix of half-wavelength dipoles, horizontally aligned a quarter wavelength above a reflecting surface and spaced at intervals of 0.61 wavelengths. The operating frequency was 2.5 GHz and the dipole lengths were reduced slightly from λ/2 to improve their radiation efficiency. The ground plane measured 32 cm along the axis parallel to the dipoles and 28 cm along the orthogonal axis. Measurements of the monostabc RCS were performed using a network analyser as source and receiver, in a low reflection environment facilitated by the use of radar absorbent foam lining a screened room. The modulation of the final prototype was achieved by switching between states of high and low reflection (i.e. amplitude modulation). A second prototype array was also built, in which the coaxial transmission lines were terminated by absorptive loads, instead of being routed to the counterpart antenna. Again, the RCS was measured and compared with the retro-array. To achieve a high modulation index, a large change in RCS was sought between the two prototypes. Sample results are shown in FIG. 11.

Figure 10:
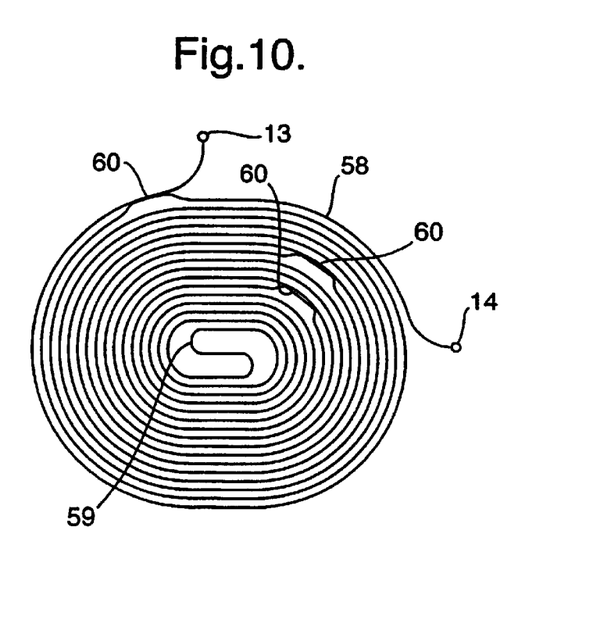

These measurements demonstrated the required characteristic of the retro-array, namely, a strong RCS which varied weakly with the look angle—see FIG. 10 in which RCS is displayed as a function of azimuthal rotation of the array at a) 0° elevational rotation (i.e. vertical) and b) 20° elevational rotation to the incident RF. RCS is shown relative to the maximum RCS of a metallic plate of the same shape as the array ground plate.

Having demonstrated that a strong change in RCS could be achieved, a third prototype array was built where switching circuitry was added to the coaxial lines behind the ground plane in the manner described above with reference to FIGS. 4 and 5.

Having fabricated the third prototype, monostatic RCS measurements were repeated to confirm that the device could be electrically switched between retro-reflective and low-reflective states.

The next test involved amplitude modulating the array with a low frequency (typically 25 KHz) signal from a signal generator such as that shown under reference 44 in FIG. 8, using a transceiver to illuminate the array with RF at close to 2.5 GHz and examining the nature of the reflected signal. The modulation waveform approximated that of a square wave. When the reflected signal was displayed on a spectrum analyser, the sidebands produced by the amplitude modulation of the reflected RF were clearly visible, as shown in FIG. 12.

From FIG. 12 we can see that the sidebands produced by square wave AM are strongly visible. It is also apparent that the power returned at the carrier frequency Fc is strongly dependent on the location of the array with respect to its environment, but the power in the first of the upper sidebands (USB) is not. This is because the power available to the modulation products is dependent on the RCS of the array, whereas the power returned at the carrier frequency is dependent on the array, the environment, and their relative locations since standing waves exist between them.

Figure 12A:
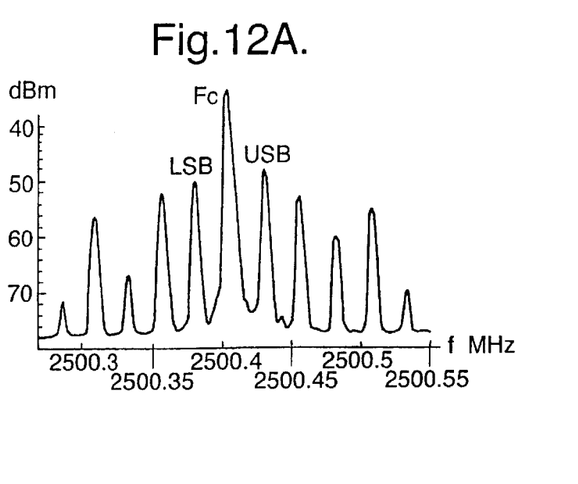
FIG. 12 shows the sideband response for an amplitude modulated, reflected RF wave at 0° azimuth to the array boresight.
Figure 12B:
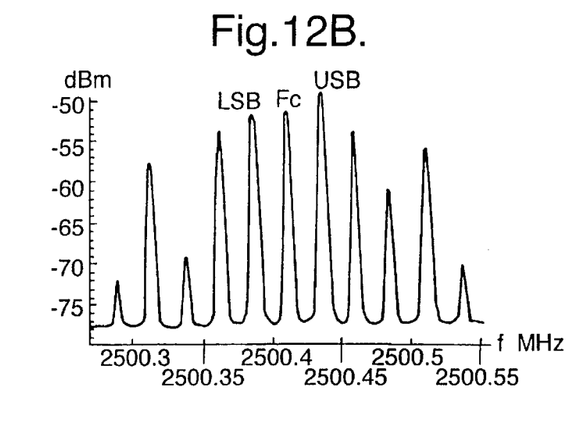

In the case shown in FIG. 12A, the array was at a local maximum for received carrier power, whereas in the case shown in FIG. 12B, the array was moved by just 3 cm (a quarter wavelength) and a minimum in carrier power—a reduction of 19 dB—resulted. The sideband powers are affected only very weakly by the small change in distance. This illustrates the enhanced detectability of a modulated scatterer in a cluttered environment.

Figure 13:
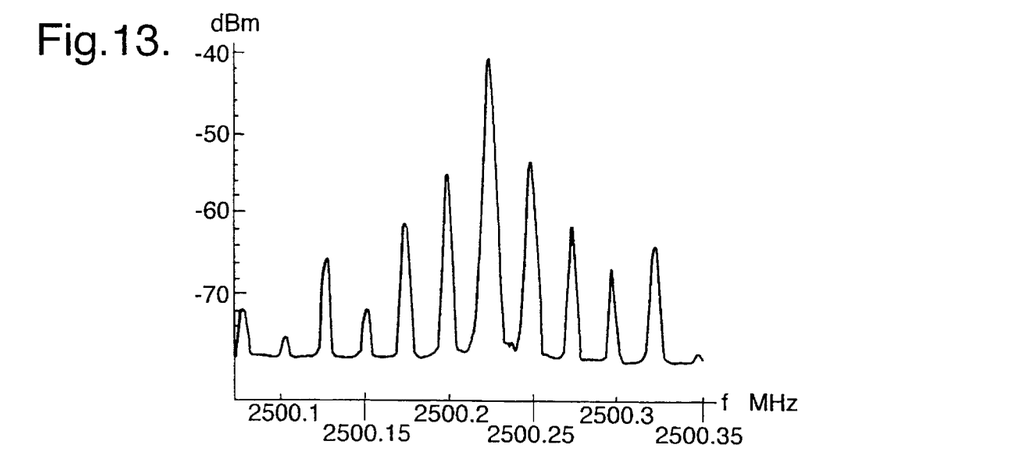
FIG. 13 corresponds to FIG. 12, but shows the response at 35° azimuth to the array boresight.

The modulation products were studied as the orientation between the array and the incident RF was varied by rotating the array in azimuth (H-plane). As expected for a retro-array, the power reflected varied slowly with orientation angle. FIG. 13 shows that the modulation products remain strongly detectable when the array is at 35 degrees to the incident illumination—the power of the first upper sideband (USB) has diminished by 4 dB compared to the "on boresight" case in FIG. 12.

Figure 14A:
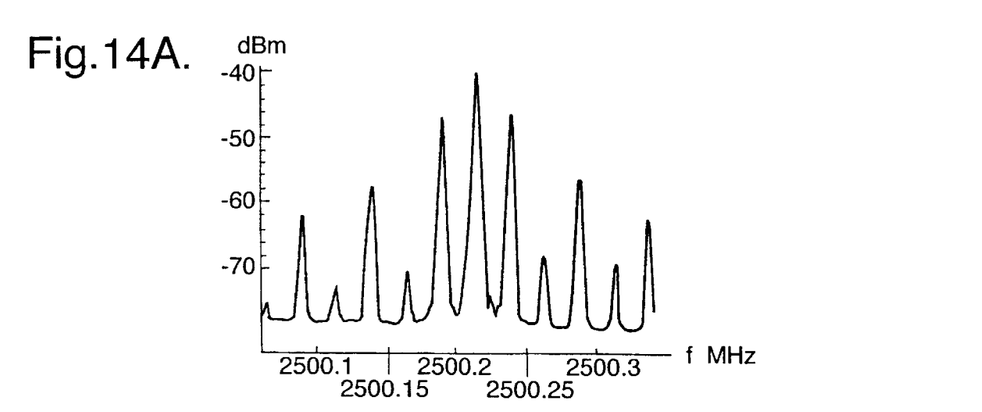
FIG. 14 is a view similar to FIG. 12, but showing the sideband response for a phase modulated reflected wave at 0° azimuth (A) and at 35° azimuth (B) to the array boresight.
Figure 14B:
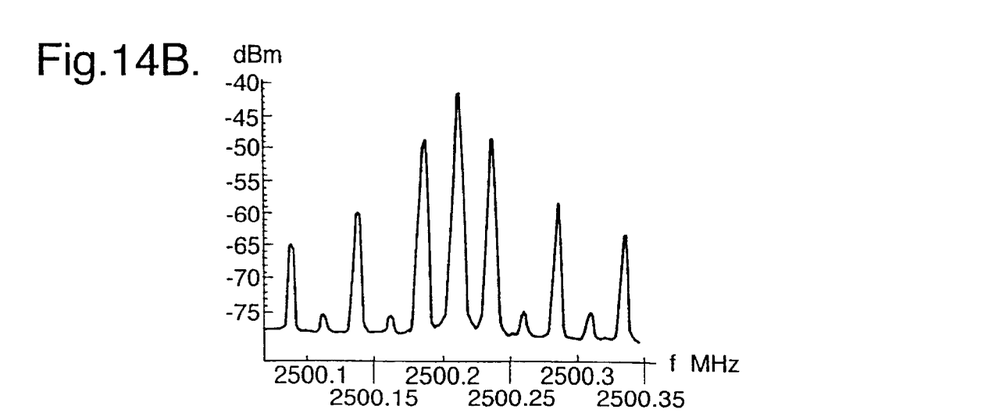

A further array was built, with the same antenna geometry as described above, but using phase shifting switches in the manner described above with reference to FIGS. 6 and 7. The theoretical phase difference between the two lengths of microstrip was 180° at 2.5 GHz. Eight phase switches were fabricated (one for each dipole pair), the typical measured phase shift being 164°±2° at 2.5 GHz. Digital phase shift modulation was achieved by applying a square wave of ±1 V amplitude to the terminal 35 of each switch. FIG. 14 shows the modulation products in this case.

Like the amplitude modulated array, the phase modulated array demonstrated that sideband power varied slowly with the orientation of the array to the illuminating signal. The first upper sideband power diminished by 3 dB when the array was rotated from 0° to 35° azimuth. The first upper sideband power was also 3 to 5 dB greater than that produced by AM, for any orientation angle from −35° to 35°.

The greater sideband power produced is consistent with phase modulation (PM) compared to AM, the latter being less energy efficient since energy is dumped into resistive loads on alternate cycles of the modulation signal. Hence the results demonstrate that phase modulation is advantageous in this application.

Figure 9:
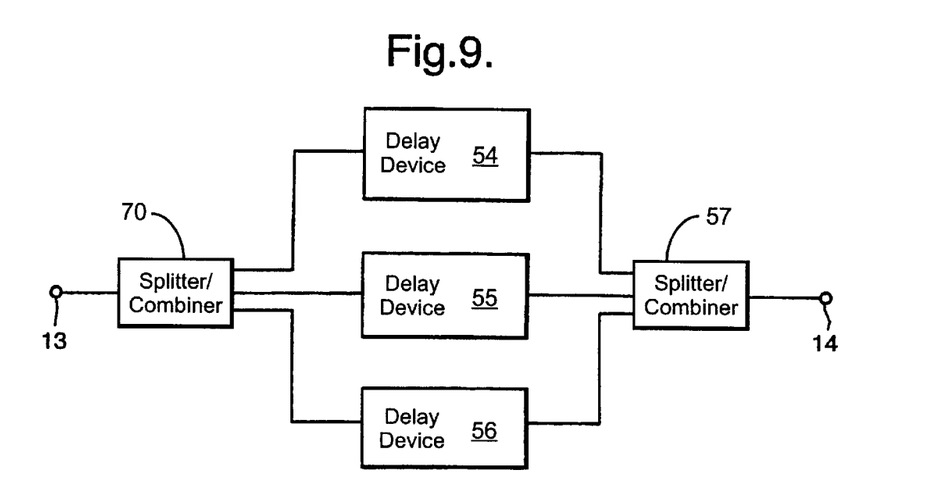
FIGS. 9 and 10 are diagrams illustrating alternative modulation devices.

Reference is now made to FIG. 9 which shows an alternative modulation device to that described previously. The device may be described as a dendritic sequence generator and has RF input/output terminals 13,14 as before by which it is connected into the transmission line 10 (not shown).

Although it is intended that the device be symmetric, in the sense that signals will be equally treated whether they are input at terminal 13 and output at terminal 14 or vice versa, it is assumed for the sake of the present explanation that the input signal is applied at terminal 13. The signal is first passed to a splitter/combiner 70 where the signal is divided into a plurality (3 in the example shown) of paths. Each of the paths is subject to a delay in a respective delay device 54, 55 or 56 before being recombined in a splitter/combiner 57. The recombined signal is passed to the terminal 14.

The delay devices may comprise active or passive circuits operable to delay the signal, or may comprise a distributed device—the most convenient way of realising the latter is simply to provide different path lengths between the two splitters for each of the three branches. An example of a lumped active circuit is a shift register.

The dendritic sequence generator can be used with pulsed radar or with continuous wave (CW) radar. With pulsed radar, each input pulse is delayed by a specific period of time which may correspond to the required position of a digital "1" in a binary word (the absence of a pulse is taken as a digital "0"). Thus the retro-reflected signal consists of a train of pulses the exact pattern of which can be determined by the number of dendritic branches, and their individual delay times. With CW radar, the system operates as a phase modulating device with given phase delays.

In both cases demodulation is carried out at the receiver (not shown) by means of a device which has a conjugate effect to that of the dendritic sequence generator, thus enabling the coded return signal from the array to be decoded.

A similar effect to that of the dendritic sequence generator can be achieved by means of a tapped delay line, an example of which is illustrated in FIG. 10, to which reference will now be made.

The tapped delay line uses what is in effect a single transmission line 58 which is folded back on itself at 59 and terminates in input/output terminals 13 and 14 which are connected in the same way and serve the same function as the corresponding terminals in the dendritic sequence generator of FIG. 9. The folded back transmission line can be linear, but a spiral version, as shown, provides space saving. At intervals along the length of the line, couplers 60 are provided which couple energy to the other half of the transmission line. In the drawing, these couplers are represented as a short section of closer spacing between the two folded-back halves of the transmission line. The construction of these couplers is well known to those skilled in the art, and may be active or passive. For example, the couplers 60 can be realised simply by varying the local spacing between the two halves of the transmission line 58; in the spiral version, the spacing between successive turns of the spiral can be varied.

It will be seen that the couplers 60 are spaced apart to thus extract energy from a specific point in one half of the transmission line, and re-insert it at a specific point in the other half of the transmission line. The amount by which the signal is delayed is thus dictated by the total length of transmission line through which it has had to pass in travelling from terminal 13 to terminal 14 or vice versa. That component of the input signal which has passed along the whole length of the transmission line, via the mid point 59, is delayed by the maximum amount. Thus the output signal essentially consists of multiple copies of the input signal, the copies all having different delay times. The output signal theoretically can have any shape, being determined by the algebraic description of the delay line.

As before demodulation is carried out at the receiver by a conjugate device, for example another tapped delay line acting as a correlator.

Both of the embodiments of FIGS. 9 and 10 are capable of being realised entirely with passive components. This has the potential advantage that power consumption is zero, which may be necessary or advantageous in certain applications, but the disadvantage that the modulation is set when the device is built and is not readily alterable thereafter. However, it is possible that the delay devices 54–56 or the couplers 60 could be switched in or out of circuit using very low, but not zero, power and this would provide the facility for changes in the modulation during the service life of the transponder. Such changes could be carried out remotely, or by direct access to the equipment.

Reference is now made to FIG. 15, which illustrates a vehicle tracking system for airports, although the same concept could be used in analogous situations, such as with maritime vessels in harbours or congested seaways. The system comprises a vehicle 90 which is to be tracked. This vehicle could be one of the many varieties of land vehicle that move around the airport and can cause a potential hazard to aircraft and, indeed, could be the aircraft themselves. It is assumed that the vehicle 90 needs to be tracked in the presence of a cluttered background of other vehicles, aircraft, buildings and miscellaneous structures. This cluttered background is represented as the shaded rectangle 91.

Tracking is carried out by means of a radar transceiver 92 having an antenna 93. This is known technology, and will not be described in detail.

The transmitter within the transceiver 92 is operable to illuminate the general area to be covered by means of a radar signal at a carrier frequency Fc. Typically the frequency used will be one of the usual frequencies available for this purpose, for example, the 2.5 GHz ISM band, the 9.4 GHz maritime band, or the 16 GHz band used by the Heathrow airport surface movement radar.

Figure 15A:
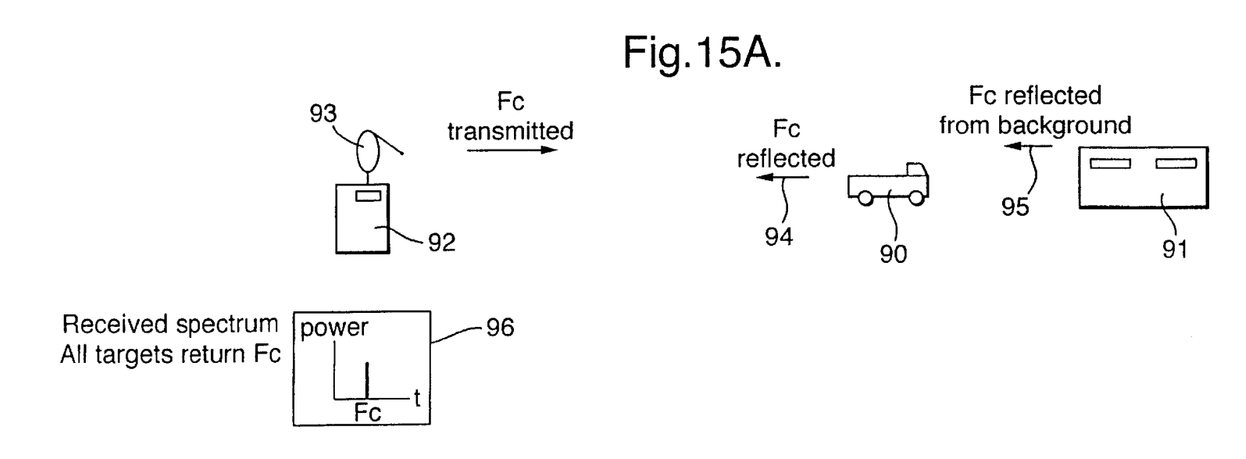
FIGS. 15A, B are diagrams showing one application of the modulated transponders of the present invention in a vehicle tracking system for use in airports.

The arrows 94 and 95 represent the reflected signal Fc from the vehicle 90 and the background 91 respectively. In FIG. 15A it is assumed that the vehicle is not equipped with a transponder or, if it is, the transponder is of the non-modulated type. In this case the frequency spectrum of the received signals from the vehicle 90 and background 91 are substantially merged into a single line, illustrated in the Power/frequency trace shown under reference 96. It will be seen that it is difficult to separate the reflection due to the vehicle 90 from that due to the cluttered background 91.

Figure 15B:
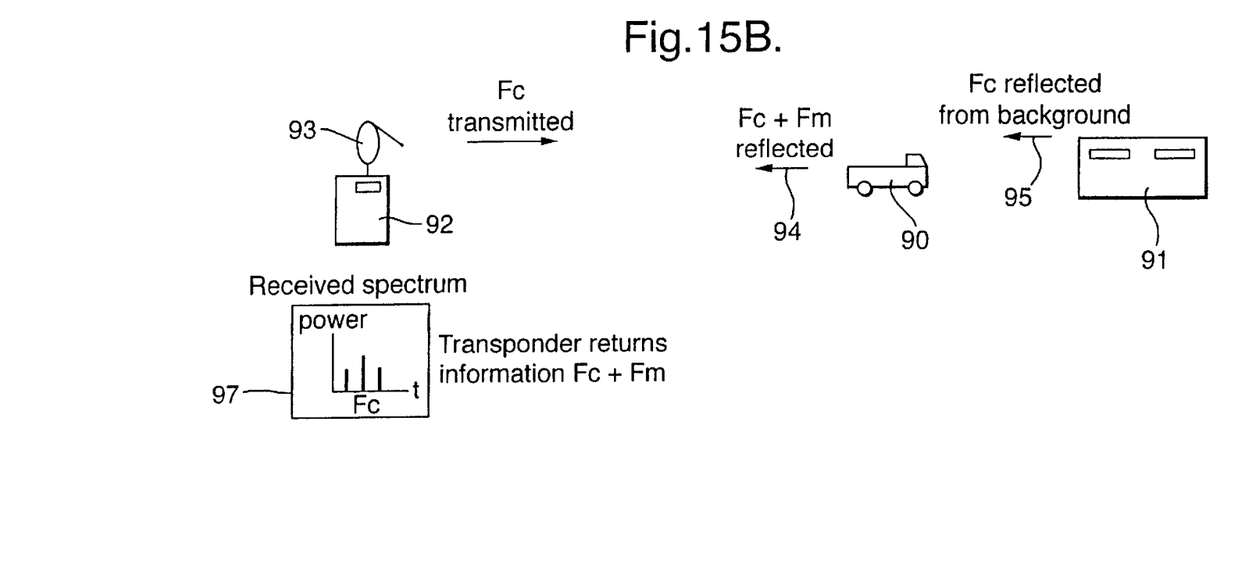

In FIG. 15B, the vehicle 11 is equipped with a transponder comprising a modulated retro-reflector such as the type described and illustrated above and, as a result, a modulated component at the frequency of modulation Fm is impressed on the retro-reflected signal from the vehicle 90. The reflected signal from the background 91 is not, of course, affected by this modulation so that, at the receiver, the vehicle 90 can be readily distinguished from the background. The received spectrum in this case is illustrated in the Power/frequency trace 97. The receiver may optionally include matched filtering to reject residual surface clutter, although this will be reduced by the retro reflecting action.

Figure 16:
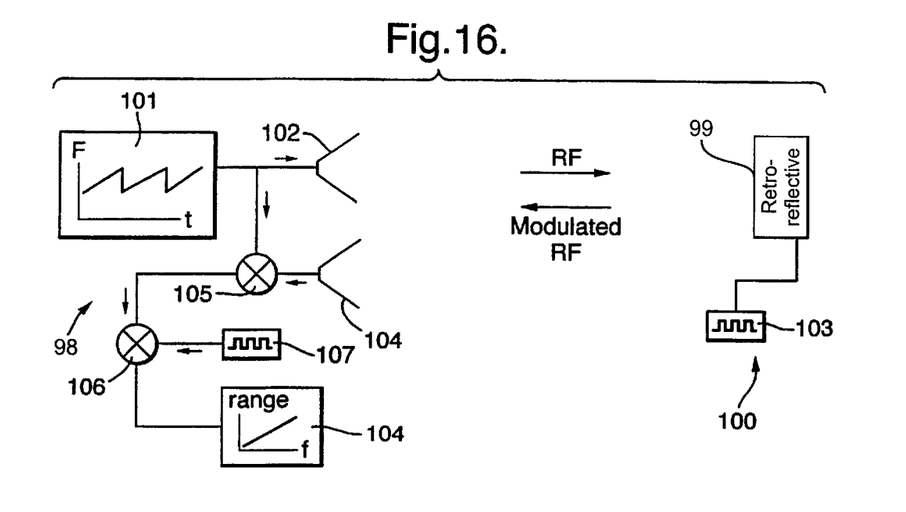
FIG. 16 is a diagram of a radar system incorporating the modulated transponders of the present invention.

The combination of modulated retro-reflectors illuminated by a swept frequency gives the potential of accurate ranging in a cluttered environment. Such a system is illustrated in FIG. 16.

The system comprises an interrogator in the form of a transceiver 98 and a modulated retro-reflector 99 forming part of a transponder 100. The transponder 100 may be attached to a fixed or movable object (not shown) to be detected. The transceiver 98 comprises a transmitter 101 and associated transmitting antenna 102 which together transmit a swept-frequency RF signal which illuminates the area to be covered by the system. The transmitted frequency may for example be swept in a sawtooth manner, as illustrated in the frequency/time graph within the box representing the transmitter 101.

The transmitted signal is reflected by all targets within the area covered including, in particular, the retro-reflector 99. The reflected signal from the retro-reflector 99 is modulated by a code generator 103 further forming part of the transponder 100.

The reflected signals are received by a receive antenna 104 and input to the receiver section of the transceiver 98. Here, the incoming RF signal is mixed, in an RF mixer 105, with the swept frequency transmitted signal output from the transmitter 101. This is conventional in radar practice. The difference signal Δf output from the mixer 105 is directly proportional to the time interval and hence path length 2L between the transmitted and the received signals:

$$\Delta f = \frac{F_{stop} - F_{start}}{T_{sweep}} \cdot \frac{2L}{c}$$

where:

$F_{start}$ and $F_{stop}$ are the start and stop frequencies respectively of the linear frequency ramp of the transmitted signal, which repeats over a time interval $T_{sweep}$; and c is the speed of light.

In cluttered or multipath environments, it is difficult to identify specific targets of small RCS. Typical values of the difference frequency Δf are several Hz up to a few KHz (audio frequencies).

The output from mixer 105 is applied to a further mixer 106 where the signal is mixed with the output from a code generator 107 whose output mirrors that of code generator 103, thereby enabling the difference frequency arising from the target to be recovered, as represented by the range/frequency graph illustrated under reference 104. This process effectively rejects all other targets, except perhaps those at very great range which produce values of Δf close to the modulating frequency.

Considering the simple case of modulation by a constant period square wave which is chosen to have a much higher frequency (food) than the difference frequency Δf. In this case the difference frequency at the output of the first mixer 105, due to reflection from the retro-reflector 99, is given by Δf+$f_{mod}$. For coherent detection a second mixer may be used in conjunction with a carrier recovery stage. At the second mixer 106, the difference frequency Δf, due to reflection from the retro-reflector 99, is recovered. Alternately an incoherent detection method may be used, such as an envelope detector preceded by a bandpass filter centred at the modulation frequency of the transponder of interest. Except as mentioned above, the reflection from other targets is rejected.

In practice, the modulation used may not be of the simple nature described above. For example, the technique could be refined by applying a pseudo-random code as the modulating waveform. The modulation could be spread spectrum; in this case, if a direct sequence spreading code is used, then the interrogator would need to know the code on the transponder in order to recover the signal.

Figure 17A:
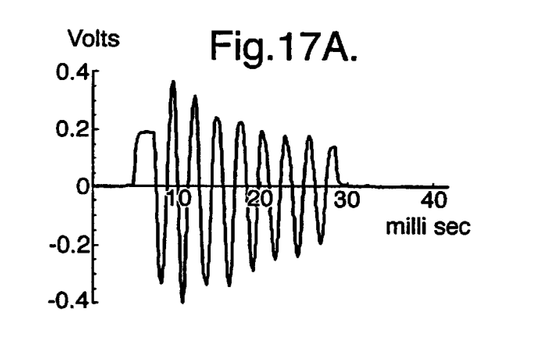
FIGS. 17A, B are graphs showing the results of tests carried out on the system, illustrated in FIG. 16.
Figure 17B:
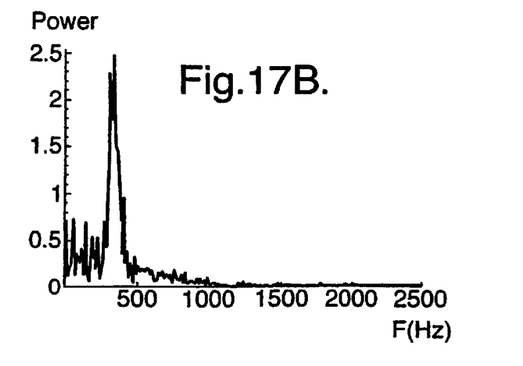

FIG. 17 shows the waveforms for the difference frequency f recovered using the above-described technique in an indoor environment using a swept carrier between 9.0 and 9.4 GHz and a 16 element retro-reflector, phase modulated with a 1 MHz square wave. FIG. 17A shows the time domain; FIG. 17B shows the frequency domain. An FFT algorithm clearly showed a strong frequency component at 355 Hz, corresponding to the target's range of 3.80 m in this case. No attempt was made to reduce background reflections in the laboratory.

In a modification of the system described with reference to FIG. 16, multiple spaced modulated retro-reflectors are used. For example three retro-reflectors and a single interrogator would be able to provide 3D range triangulation. The receiver in such a system is fitted with multiple local oscillators, one for each retro-reflector, to enable the range to each retro-reflector to be calculated. The accuracy of such a system will of course depend upon the separation of the retro-reflectors, and the range. In principle, if the link budget permits, it becomes like a global positioning system and is subject to similar constraints. The system can also be operated the other way around, i.e. with three spaced interrogators and a single modulated retro-reflector to provide 3D range triangulation.

What is claimed is:

1. A transponder comprising an array of antennas interconnected in pairs by means of transmission lines arranged in a connection pattern in which each of the pairs comprises two antennas positioned symmetrically with respect to the centre point of the array so as to render the array retro-reflective in two dimensions at least some of said transmission lines being of a different length to the remainder and wherein all of the transmission lines pass from one antenna of a pair to the other antenna of the pair without crossing over any other of said transmission lines.

2. A transponder as claimed in claim 1 wherein the length l of each transmission line is given by:

$$l = A \pm n\lambda$$

where:
A is an arbitrary length;
n is zero, or an integer;
$\lambda$ is the wavelength of the electromagnetic wave to be retro-reflected and wherein the value of n is different for at least some of the transmission lines over the remainder.

3. A transponder as claimed in claim 2 wherein said antenna array is a two-dimensional array.

4. A transponder as claimed in claim 1 wherein an amplifier is connected in each of at least some of said transmission lines in order to amplify the signal passing from one antenna of the pair without crossing over any other of said transmission line.

5. A transponder as claimed in claim 1 wherein a modulation device is connected in each of at least some of said transmission lines in order to modulate the signal passing from one antenna of the array to another via said transmission line.

6. A transponder as claimed in claim 5 wherein said modulation device comprises modulation means acting on each said amplifier.

7. A transponder as claimed in claim 5 further including input means for altering a parameter of the modulation applied to the signal.

8. A transponder as claimed in claim 7 wherein said input means includes a sensor for sensing some parameter of the environment in which the transponder is situated.

9. A transponder as claimed in claim 7 wherein said input means including a manual input device whereby information may be manually entered and modulated onto the signal.

10. A transponder as claimed in claim 5 wherein the modulation device includes means for frequency modulating the signal in order to mimic doppler shifting.

11. A transponder as claimed in claim 5 in which the modulation device comprises switching means controlled by a modulating signal, said switching means being operable to cyclically switch an incoming signal about a plurality of paths at least some of which contain circuit elements operable to vary a parameter of the signal and thus modulate the signal at the frequency of the modulating signal.

12. A transponder as claimed in claim 11 in which said circuit elements are operable to vary the amplitude of the signal to thus amplitude modulate the signal.

13. A transponder as claimed in claim 12 wherein said switching means is operable to connect said incoming signal alternately to a straight-through connection in which the signal passes through the device with its amplitude substantially unchanged and to a load which wholly or partially absorbs the signal.

14. A transponder as claimed in claim 11 in which said circuit elements are operable to vary the phase of the signal to thus phase modulate the signal.

15. A transponder as claimed in claim 14 in which said switching means is operable to connect said incoming signal alternately between two paths of different path length.

16. A transponder as claimed in claim 15 in which the difference between the path lengths is half the wavelength of the incoming signal.

17. A transponder as claimed in claim 11 in which said switching means comprises semi-conductor switches.

18. Ad transponder as claimed in claim 17 wherein said semi-conductor switches comprise or include switching diodes.

19. A transponder as claimed in claim 5 in which the modulation device comprises splitter means for splitting the incoming signal into at least two paths, a circuit element being connected in each path and operable to vary some parameter of the signal passing along the path, and combiner means for recombining the signals from the individual paths.

20. A transponder as claimed in claim 19 wherein said circuit elements comprise delay elements, and wherein the delay elements in the various paths are set to different time delays so that the recombined signal is a summation of the original incoming signal, delayed by different amounts.

21. A transponder as claimed in claim 20 wherein said modulation device takes the form of a dendritic sequence generator.

22. A transponder as claimed in claim 20 wherein said modulation device takes the form of a tapped delay line.

23. A positioning/tracking system for fixed or movable objects, said system comprising at least one modulated transponder, a transmitter for transmitting a signal to illuminate the or each transponder, a receiver for receiving the retro-reflected signal from the transponder or transponders and discriminator means within the receiver for demodulating the modulated signal from the transponder or transponders to enable a wanted reflected signal to be identified, wherein the transmitter includes means for sweeping its transmitted output frequency.

24. A system as claimed in claim 23 wherein the or each transponder comprises a transponder including:
   an array of antennas interconnected in pairs by means of transmission lines in such a way as to render the array retro-reflective; and
   a modulation device connected in each of at least some of said transmission lines in order to modulate the signal passing from one antenna of the array to another via said transmission line.

25. A system as claimed in claim 24 wherein the or each transponder is provided with a code generator which is operable to modulate the signal reflected from the transponder.

26. A system as claimed in claim 25 wherein the receiver is equipped with a code generator whose output mirrors that of the code generator on the or each transponder, and a mixer for mixing the received signal with the output from the receiver code generator whereby to output a difference frequency representative of the range of the transponder.

27. A system as claimed in claim 25 wherein the code generators are operable to generate a pseudo-random code as a modulating waveform.

28. A system as claimed in claim 25 wherein the modulating signal is spread spectrum.

29. A system as claimed in claim 23 comprising multiple spaced modulated transponders arranged in order to obtain range information.

30. A system as claimed in claim 23 comprising multiple spaced transmitters for illuminating a single modulated transponder and respective receivers associated with each of said transmitters for receiving retro-reflected signals from said transponder, the arrangement being such as to provide multi-dimensional range information.

* * * * *